United States Patent
Agnihotri et al.

(10) Patent No.: US 9,068,141 B2
(45) Date of Patent: Jun. 30, 2015

(54) **PROCESS FOR THE MODIFICATION OF *CURCUMA AROMATICA* ESSENTIAL OIL**

(75) Inventors: Vijai Kant Agnihotri, Himalchal Pradesh (IN); Bikram Singh, Himalchal Pradesh (IN); Garikapati Dyva Kiran Babu, Himalchal Pradesh (IN); Gopi Chand, Himalchal Pradesh (IN); Rakesh Deosharan Singh, Himalchal Pradesh (IN); Paramvir Singh Ahuja, Himalchal Pradesh (IN)

(73) Assignee: Council of Scientific & Industrial Research, New Delhi (IN)

( * ) Notice: Subject to any disclaimer, the term of this patent is extended or adjusted under 35 U.S.C. 154(b) by 91 days.

(21) Appl. No.: 14/000,539

(22) PCT Filed: Mar. 1, 2012

(86) PCT No.: PCT/IB2012/050962
§ 371 (c)(1),
(2), (4) Date: Aug. 20, 2013

(87) PCT Pub. No.: WO2012/131505
PCT Pub. Date: Oct. 4, 2012

(65) Prior Publication Data
US 2013/0331467 A1    Dec. 12, 2013

(30) Foreign Application Priority Data
Mar. 29, 2011 (IN) .......................... 0866/DEL/2011

(51) Int. Cl.
| | | |
|---|---|---|
| A61K 36/9066 | (2006.01) | |
| C11B 9/00 | (2006.01) | |
| A23L 1/222 | (2006.01) | |
| C11B 9/02 | (2006.01) | |

(52) U.S. Cl.
CPC .............. *C11B 9/0046* (2013.01); *A23L 1/222* (2013.01); *C11B 9/022* (2013.01)

(58) Field of Classification Search
None
See application file for complete search history.

(56) References Cited

U.S. PATENT DOCUMENTS

| | | | | |
|---|---|---|---|---|
| 4,842,859 | A * | 6/1989 | Liu | 424/736 |
| 5,108,750 | A * | 4/1992 | Liu | 424/764 |
| 6,224,877 | B1 * | 5/2001 | Gaikar et al. | 424/756 |

FOREIGN PATENT DOCUMENTS

| | | |
|---|---|---|
| WO | 03/051380 | 6/2003 |
| WO | 2011/014880 | 2/2011 |
| WO | WO2011014880 A1 * | 3/2011 |

OTHER PUBLICATIONS

Gopichand et al., Industrial Crops and Products, an International Journal, "Effect of manure and plant spacing on crop growth, yield and oil-quality of *Curcuma aromatica* Salisb. In mid hill of western Himalaya", Institute of Himalayan Bioresource Technology (CSIR), India, 2006, 8 pages.
Bouchra et al., Journal of Ethno-Pharmacology, "Chemical composition and antifungal activity of essential oils of seven Moroccan Labiatae against *Botrytis cinerea* Pers: Fr.", 2003, 5 pages.
Guenther et al., "The Essential Oils, vol. Two: The Constituents of Essential Oils", 1975, pp. 434-435, 2 total pages.
Kandemir et al., Chemistry of Natural Compounds, vol. 44, No. 4, 2008, "Essential Oil Composition of *Tanacetum* alyssifolium, An Endemic Species From Turkey", 0009-3130/08/4404-0530, 2008, 2 pages.
International Search Report for PCT Application No. PCT/IB2012/050962, dated Jun. 12, 2012, 3 pages.
Written Opinion for International Search Report for PCT Application No. PCT/IB2012/050962, dated Jun. 12, 2012, 7 pages.

* cited by examiner

*Primary Examiner* — Chris R Tate
*Assistant Examiner* — Randall Winston
(74) *Attorney, Agent, or Firm* — Westman, Champlin & Koehler, P.A.

(57) ABSTRACT

*Curcuma aromatica* essential oil is blue-black dark liquid with camphoraceous, woody, amber and spicy characteristic odor and is less valued in market, however the prepared value added products have very good shining color with the improved fragrance. The present invention relates to an efficient process for the modification of *Curcuma aromatica* essential oil to develop value added fragranced products, the process comprising the steps of mixing of essential oil with one solvent or a combination of more than one solvents, cooling the mixture over ice bath or at lower temperature at rotation of 1000 rpm or at simple magnetic stirrer at high speed, addition of reducing agent at different proportion at a certain time period for desired product, after completion of the reaction, addition of ice water to the reaction mixture to terminate the reaction, extracting the mixture using solvent for three to five times, washing the extractive with dilute acidic water and then with water, washed product was dried at lower temperature to obtain modified essential oils in order to develop fragranced products with recovery of 60 to 95% and use of the modified essential oil in the range between 0.05 to 100% in perfumery or allied industries.

11 Claims, 3 Drawing Sheets

Figure: 1

PROCESS FOR THE MODIFICATION OF *CURCUMA AROMATICA* ESSENTIAL OIL

CROSS-REFERENCE TO RELATED APPLICATION

This Application is a Section 371 National Stage Application of International Application No. PCT/IB20121050962, filed 1 Mar. 2012 and published as WO 2012/131505 A1 on 4 Oct. 2012, in English, which claims priority of Indian Patent Application No. IN 0866/DEL/2011, filed on 29 Mar. 2011, the contents of which are hereby incorporated by reference in their entirety.

FIELD OF THE INVENTION

The present invention relates to the process for the modification of *Curcuma aromatica* essential oil to develop value added fragranced products.

More particularly the present invention relates to the development of process for the specific reduction of carbonyl groups of the constituents present in *Curcuma aromatica* essential oil for preparation of their hydroxyl derivatives e.g. camphor to borneol, curdione to its dihydroxyl derivative etc.

The present invention further relates to the use of the developed modified essential oil from *Curcuma aromatica* having their utility in perfumery, fragrance, pharmaceutical, food, agrochemicals, in other household or agricultural applications and allied and for the preparation of esters, epoxides, peroxides, acids, amides, halides, ethers and oximes etc.

BACKGROUND OF THE INVENTION

*Curcuma* is a genus having several accepted species in the plant family Zingiberaceae. The name *Curcuma* comes from Arabic kurkum meaning "turmeric". Several species of the *Curcuma* were growing all over the India but mainly *Curcuma* is known because of *Curcuma longa* and *Curcuma aromatica*.

*Curcuma aromatica*, locally known as *Jungli Haldi* is found as a wild species throughout India, though cultivated in West Bengal and Travancore (The Wealth of India, 1950). The rhizome is light yellow (internally orange red) in colour and possesses a camphoraceous odour. Flowers are pinkish white in color, with an orange lip. The stalk grows to about 8 to 10 inches tall, and is crowned with enlarged colored bracts tipped with pink. Leaves appear after the flowers. When in full growth the plants can reach a height of about 3 ft tall. Leaves are broad and very decorative, elliptic, 3-4 ft long, and 20 cm wide, leaf-stalk being as long as the blade. Grows fast and vigorously during the summer monsoon months. Rhizomes used to a limited extent in villages for flavouring curries. The essential oil is obtained from the rhizomes of the plant by steam distillation is a blue-black dark liquid with camphoraceous, woody, amber and spicy characteristic odour, contains 1,8-cineole, camphor, α-terpinolene, isobornyl alcohol, borneol and curdione (Gopichand et al., 2006).

*C. aromatica* rhizome's steam distilled essential oil appears to be having sharp camphoraceaous odour because of the presence of camphor as a major constituent. References may be made to Journal "Effect of manure and plant spacing on crop growth, yield and oil-quality of *Curcuma aromatica* Salisb. in mid hill of western Himalaya, Industrial Crops and Products, 24, 105" by Gopichand, R. D. Singh, R. L. Meena, M. K. Singh, V. K. Kaul, Brij Lal, Ruchi Acharya, Ramdeen Prasad, 2006. The attempts were made to reduce the carbonyls selectively to convert the camphor rich essential oil of *Curcuma aromatica* to borneol rich transformed product. Nature has very limited sources for the borneol rich essential oil e.g. *Tanacetum alyssifolium, Rosmarinus officinalis*.

References may be made to Journals "Essential Oil Composition of *Tanacetum alyssifolium*, an Endemic Species from Turkey, Chemistry of Natural Compounds, 44 (4), 530" by Ali Kandemir, Hakan Ozer, Hamdullah Kilic, Ahmet Cakir, and Yavuz Demir, 2008; and "Chemical composition and antifungal activity of essential oils of seven Moroccan Labiatae against *Botrytis cinerea* Pers: Fr. Journal of Ethnopharmacology, 89, 165" by Chebli Bouchraa, Mohamed Achourib, L. M. Idrissi Hassanic, Mohamed Hmamouchi, 2003. There is not any work reported in the literature related to chemical transformation study over *Curcuma aromatica* essential oil.

References may be made to Journal "The essential Oils, Vol II, p 434-435; Berthelot, 1859, Liebigs Ann, 110, 368; Baubigny, 1866, Compt rend., 63, 221" by Ernest Guenther, 1975 where it discloses some reports where camphor was transformed into borneol by using the reaction.

*Curcuma aromatica* essential oil is blue-black dark liquid with camphoraceous, woody, amber and spicy characteristic odour containing a mixture of mono and sesquiterpenes eg. camphene, 1,8-cineole, camphor, α-terpinolene, isobornyl alcohol, borneol, curdione etc. and is less valued in perfumery industry. The odor was further improved by application of the present invention which produced the products having improved fragrance (because of synergistic effect of the compounds present in conversion of carbonyl compounds (e.g. Camphor and curdione) into their reduced products the product) and have received the value added developed products. The developed products have new fragrance and can be easily adopted by the perfumery and allied industry.

OBJECTIVE OF THE INVENTION

The main object of the present invention is to develop a simple process by modifying the essential oil of *Curcuma aromatica* for developing value added fragrance products.

Another object of the present invention is to provide easy and convenient method for the transformation of the carbonyl groups present in *C. aromatica* essential oil into their hydroxyl derivatives.

Yet another object of the present invention is to provide methodology for preparation of borneol enriched essential oil from *C. aromatica* essential oil.

Still another object of the present invention is to make different fragrances from the original *Curcuma aromatica* oil.

Yet another object of the present invention is the usage of modified fragranced products as a perfumery and flavouring products or as an ingredient of perfumery, flavour and pharmaceutical products ranging between 0.05 to 100%.

Still another object of the present invention is its scope of commercial production of converted product in flavour, perfumery, food, pharmaceutical, and allied industries for aroma, medicine and agrochemical products.

Still another object of the present invention is its scope of conversion of the said product in to different derivatives like, esters, epoxides, peroxides, acids, amides, halides, ethers and oximes etc. to obtain several other products for perfumery, flavour and pharmaceutical industries.

Still another object of the present invention is its scope of partitioning through crystallization, fractionation or by partition between polar and non polar solvents for isolation of molecules.

SUMMARY OF THE INVENTION

Accordingly, the present invention provides a process for the modification of *Curcuma aromatica* essential oil for the preparation of value added fragranced products wherein the said process comprising the steps of:

(i) providing essential oil of *Curcuma aromatica*;
(ii) mixing essential oil of *Curcuma aromatica* as provided in step (i) with solvent in the ratio ranging between 1:5-1:40 to obtain a reaction mixture;
(iii) cooling the reaction mixture as obtained in step (ii) at temperature in the range of 10° C. to −20° C.;
(iv) reducing the cooled reaction mixture as obtained in step (iii) by adding reducing agent in the ratio of essential oil: reducing agent 1:0.1-1:2 gradually to the reaction mixture for a period in the range of 1 hr to 48 hrs followed by adding ice water to the reaction mixture to terminate the reaction;
(v) extracting the product from the reaction mixture as obtained in step (iv) using solvent for three to five times at temperature in the range of 5° C. to 35° C.;
(vi) washing the solvent extract as obtained in step (v) with dilute acidic water (ph=less than 1) concentration in the range of 1-5% followed by washing with water to obtain the washed product;
(vii) removing the solvent from the washed product as obtained in step (vi) at temperature in the range of 40° C.-50° C. to obtain modified essential oils of *Curcuma aromatica*.

In an embodiment of the present invention, the essential oil is obtained from the rhizomes of *Curcuma aromatica* as a whole or in crushed form.

In another embodiment of the present invention, the essential oil of *Curcuma aromatica* was extracted by steam distillation or by hydrodistillation for a period in the range of 5 mins-72 hrs.

In yet another embodiment of the present invention, reducing agent used is selected from the group consisting of sodium metal, potassium metal, $LiAlH_4$, $NaBH_4$, Aluminium isopropoxide, or direct hydrogenation etc or a combination of the said reduction methods preferably by using sodium metal.

In still another embodiment of the present invention, the solvents used are selected from the group consisting of methanol, ethanol, propanol, butanol or combinations thereof.

In yet another embodiment of the present invention, the solvents used for extraction are selected from the group consisting of hexane, petroleum ether, benzene, chloroform, dichloro methane, ethyl acetate, ether or combinations thereof.

In still another embodiment of the present invention, the recovery percentage of the modified essential oil of *Curcuma aromatica* is in the range of 70% to 85%.

In still another embodiment of the present invention, the total modification in the essential oil is in the range of 37% to 57% with respect of camphor, isoborneol, borneol, and cudione.

In yet another embodiment of the present invention, the final products are free from solvent residues.

In yet another embodiment of the present invention, the final products are freely soluble in non polar and medium polar solvents.

In still another embodiment of the present invention, the modified essential oil from *Curcuma aromatica* are useful in perfumery, fragrance, pharmaceutical, food, agrochemicals, in other household or agricultural applications and allied and for the preparation of esters, epoxides, peroxides, acids, amides, halides, ethers and oximes etc.

DETAILED DESCRIPTION OF THE INVENTION

Figure 1:
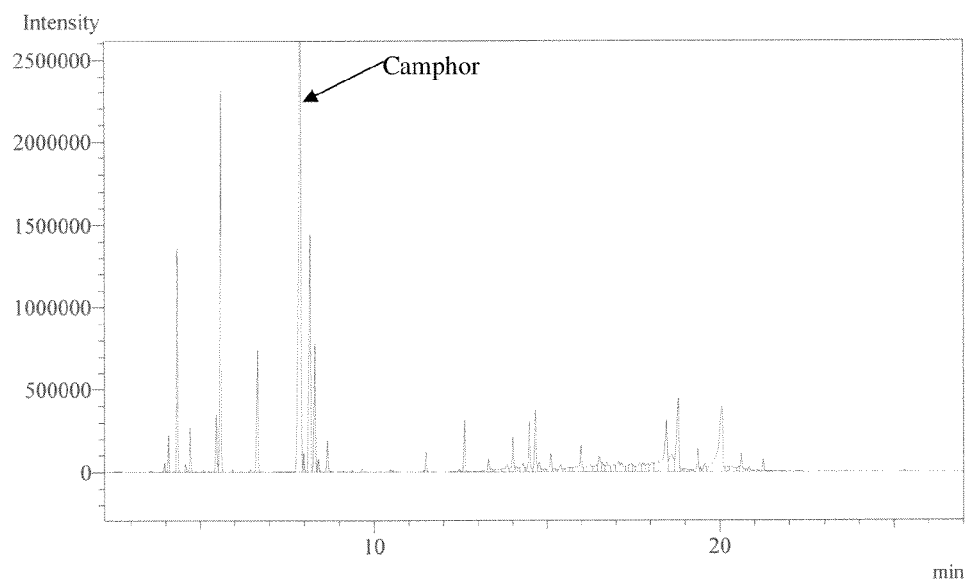
FIG. 1 represents Gas Chromatograph of the starting essential oil of *Curcuma aromatica* rhizomes.
Figure 2:
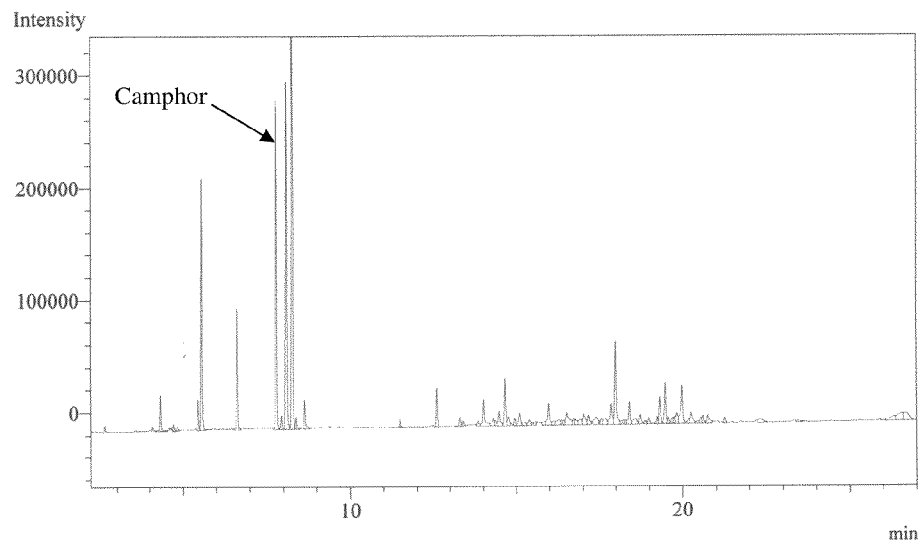
FIG. 2 represents Gas Chromatograph of the partially reduced value added product of *C. aromatica*.
Figure 3:
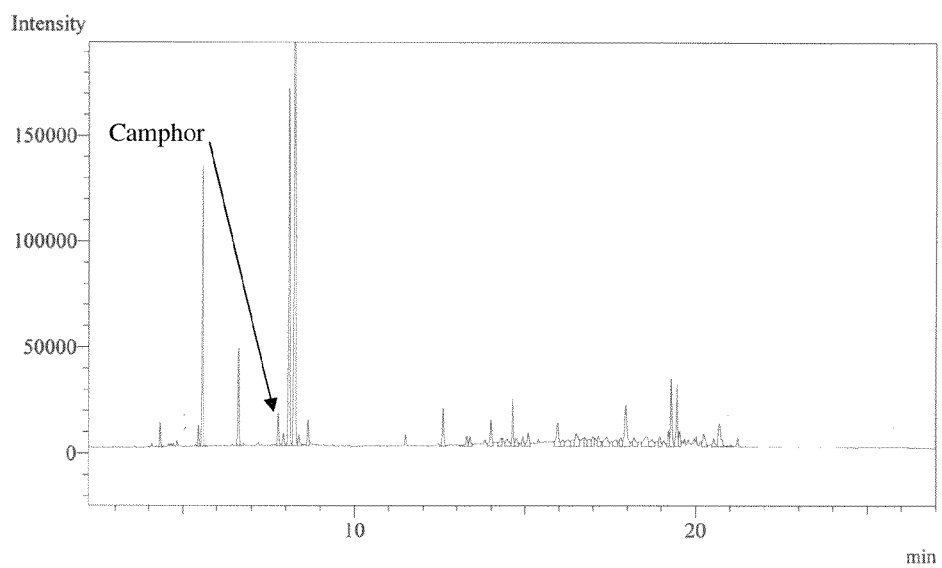
FIG. 3 represents Gas Chromatograph of the totally reduced value added product of *C. aromatica*.
Figure 4:
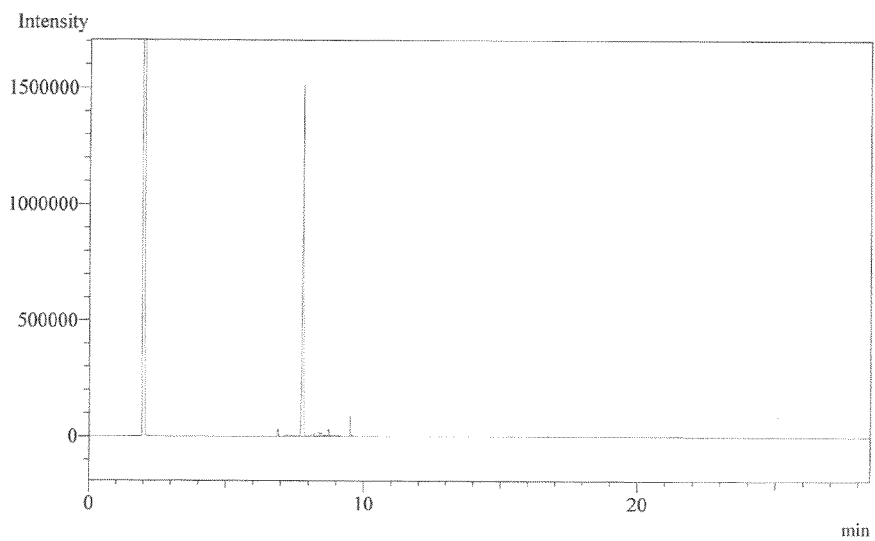
FIG. 4 represents Gas Chromatograph of the reference standard Camphor.
Figure 5:
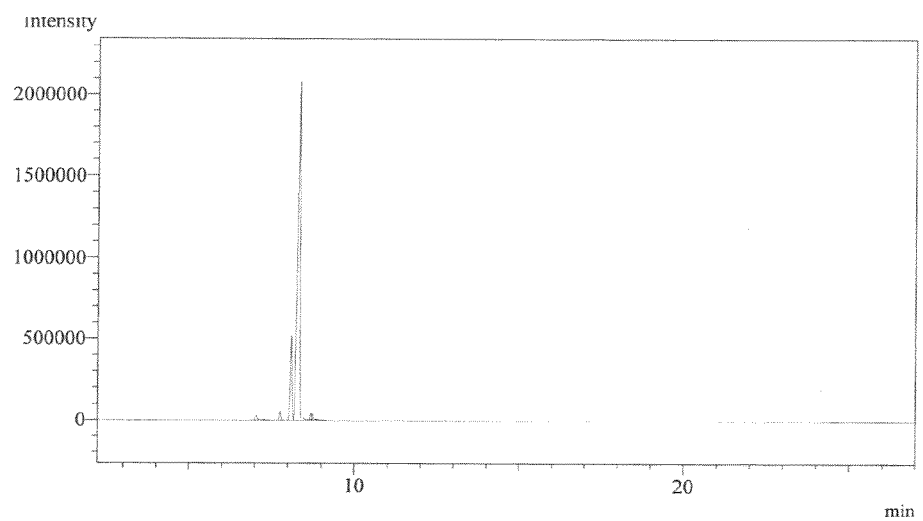
FIG. 5 represents Gas Chromatograph of the reference standard Borneol.

The present invention provides the process for the modification of *Curcuma aromatica* essential oil to develop value added fragranced products. The process comprise mixing of essential oil with one solvent or a combination of more than one solvent as a diluent for conversion into other products. The prepared mixture of essential oil and alcohol was kept over ice bath or at temperature range 0° to −20° C. for cooling the mixture over magnetic stirrer and then it further taken for step of one reduction reaction to partial or complete modification, the reaction was started by addition of sodium metal (wire or small pieces) gradually for the preparation of value added essential oil products. After completion of the reaction the reaction was terminated by addition of the cold deionized water or ice prepared from deionized water. The whole reduction reaction time varied from 1 hr to 48 hrs. Reaction was completed at the rotation of more than 1000 rpm or over magnetic stirrer at different rotations. The resultant mixture was extracted by using one solvent or a mixture of medium polar solvents for three times or more in separating funnel for recovery of complete final modified product and was washed by dilute acidic water followed by deionized water. The solvent was removed under reduced temperature and pressure for obtaining final crude material (recovery of 60 to 95%).

The fresh rhizomes of *Curcuma aromatica* were collected in February 2010 from the Institute of Himalayan Bioresource Technology, Palampur (HP), India, farm land and thoroughly crushed or cut into pieces for steam distillation in pilot plant. The essential oil was obtained by steam distillation of the fresh rhizomes for 0-72 hrs, the afforded essential oil was a blue-black dark coloured oil having camphoraceous, woody, amber and spicy characteristic odour (yield 0.24%). The oil was dried over anhydrous sodium sulphate and kept at low temperature until further analysis and conversion. Alternatively the essential oil of *C. aromatica* rhizomes (fresh or dried) was also obtained in the laboratory by direct hydrodistillation using clevenger type apparatus. Both the essential oils were evaluated for chemical composition and have found similar qualitative results containing camphene, 1,8-cineole, camphor, α-terpinolene, isobornyl alcohol, borneol, curdione with difference in quantitative results.

2 mL of obtained essential oil was mixed with alcohol (methanol, ethanol or mixture of alcohols ranging from C-1 to C-4) in the ratio of essential oil:alcohol 1:0.1 to 1:50 or more and allowed to cool the mixture in the range of 0 to −20° C. or more and after the mixture was cooled the reaction was started under rotation (0-2000 rpm) and by gradually adding a definite quantity of sodium metal small pieces for the required partial or complete conversion (for development of the fragrance that is a total fragrance chemical composition developed because of synergistic effect of the converted compounds), after completion of the reaction the reaction was terminated by adding deionized cooled water (or ice prepared from deionized water). The reaction time was varied depending upon the required product (1 hr to 48 hrs). The alcohol was distilled out using rotavapor and then the reaction product was extracted by using medium polar solvents (e.g. hexane, pet-ether, chloroform etc). The final solvent extractive was washed with small quantity of acidic water followed by deionized water and then passed from anhydrous sodium sulphate. The final solution was evaporated under reduced pressure and at 45° C. to obtain final crude value added products. The total recovery was varied from 60 to 95%.

EXAMPLES

The following examples are given by way of illustration and therefore should not be construed to limit the scope of the present invention.

Example 1

The fresh rhizomes of *Curcuma aromatica* were collected in February 2010 from farm land at the Institute of Himalayan Bioresource Technology, Palampur (HP), India, and thoroughly crushed or cut into pieces for steam distillation in pilot plant. The essential oil was obtained by steam distillation of the fresh rhizomes for 3 hrs, the sample afforded a blue-black dark coloured oil having camphoraceous, woody, amber and spicy characteristic odour (yield 0.13%). The oil was dried over anhydrous sodium sulphate and kept at low temperature (4° C.) until further analysis and conversion.

*Curcuma aromatica* rhizome essential oil (2 ml) mixed in methanol in the proportion of essential oil:methanol 1:7.5, cooled into ice bath at temperature 0° C. and after 15 minutes, the reaction was started by slowly adding 1 g sodium metal for 3 hrs (the essential oil:sodium metal ratio 1:0.5) at rotation of around 1000 rpm (at simple magnetic stirrer) by slowly adding for the required conversion. After completion of the reaction, the reaction was terminated by adding cool deionized water (or ice prepared from deionized water). The final reaction product was extracted by using medium polar solvent chloroform (3×60 ml). The final solvent extractive was washed with small quantity of acidic water concentration (60 ml) in the range of 1-5% followed by washing with deionized water (2×50 ml) to obtain the washed product and then passed through anhydrous sodium sulphate. The final solution was evaporated at 45° C. under reduced pressure to obtain modified essential oil to be used further for producing value added products. The total recovery was 85%. The total recovered fragrance product has specific changes in the present experiment with respect to camphor, isoborneol, borneol and curdione and was found to be 37.8% (Table 1, 2 & 3).

Example 2

*Curcuma aromatica* rhizome's essential oil (2 ml) mixed in dried ethanol in the proportion of essential oil:ethanol 1:15, cooled into ice bath or at temperature 0° C. and after the mixture was cooled, the reaction was started by slowly adding 2.5 g sodium metal (essential oil:sodium metal ratio, 1:1.25) small pieces at rotation of around 1000 rpm (at simple magnetic stirrer) for 10 hrs for the required conversion, after completion of the reaction, the reaction was terminated by adding deionized cooled water (or ice prepared from deionized water). The reaction time was 10 hrs. The final reaction product was extracted by using medium polar solvent chloroform (3×50 ml). The final solvent extractive was washed with small quantity of acidic water (50 ml, pH=less than 1) followed by deionized water (2×50 ml) and then passed through anhydrous sodium sulphate. The final solution was evaporated under reduced pressure and at 45° C. to obtain modified essential oil to be used further for producing value added products. The total recovery was 70%. The total recovered fragrance product has specific changes in the present experiment with respect to camphor, isoborneol, borneol and curdione and was found to be 56% (Table 1, 2 & 4).

Example 3

*Curcuma aromatica* rhizome's essential oil (2 ml) mixed in dried ethanol in the proportion of essential oil:ethanol 1:15, cooled into ice bath or at temperature 0° C. and after the mixture was cooled, the reaction was started by slowly adding 2.0 g sodium metal (essential oil:sodium metal ratio, 1:1) small pieces at rotation of around 1000 rpm (at simple magnetic stirrer) for 12 hrs for the required conversion, after completion of the reaction, the reaction was terminated by adding deionized cooled water (or ice prepared from deionized water). The reaction time was 12 hrs. The final reaction product was extracted by using medium polar solvent chloroform (3×60 ml). The final solvent extractive was washed with small quantity of acidic water (50 ml, pH=less than 1) followed by deionized water (2×50 ml) and then passed through anhydrous sodium sulphate. The final solution was evaporated under reduced pressure and at 45° C. to obtain modified essential oil to be used further for producing value added products. The total recovery was 80%. The total recovered fragrance product has specific changes in the present experiment with respect to camphor, isoborneol, borneol and curdione and was found to be 46.5% (Table 1, 2 & 5).

TABLE 1

Summary of the examples 1 to 3 in tabular form

| Examples | Essential oil (ml) | Solvent (ml) | Metal used (g) | Recovery (%) | Specific % of modification |
|---|---|---|---|---|---|
| 1 | 2 ml | Methanol (15 ml) | 1.0 g | 85% | 37.8% |
| 2 | 2 ml | Ethanol (30 ml) | 2.5 g | 70% | 56% |
| 3 | 2 ml | Ethanol 30 ml | 2.0 g | 80% | 46.5% |

TABLE 2

Summary of the specific changes in essential oil constituents in examples 1 to 3

| Constituents | Starting Essential oil (%) | Example 1 (%) | Example 2 (%) | Example 3 (%) |
|---|---|---|---|---|
| Camphor | 24.4 | 12.3 | 1.3 | 4.0 |
| Isoborneol | 7.7 | 13.4 | 13.7 | 12.1 |
| Borneol | 3.5 | 20.7 | 27.1 | 22.4 |
| Curdione | 3.3 | 0.5 | Trace | 0.5 |

TABLE 3

Summary of the specific changes in essential oil constituents in example 1

| Constituents | Starting Essential oil (%) | Example 1 (%) | Specific Change (%) |
|---|---|---|---|
| Camphor | 24.4 | 12.3 | 24.4 – 12.3 = 12.1 |
| Isoborneol | 7.7 | 13.4 | 13.4 – 7.7 = 5.7 |
| Borneol | 3.5 | 20.7 | 20.7 – 3.5 = 17.2 |
| Curdione | 3.3 | 0.5 | 3.3 – 0.5 = 2.8 |
| | | | Total = 12.1 + 5.7 + 17.2 + 2.8 = 37.8 |

TABLE 4

Summary of the specific changes in essential oil constituents in example 2

| Constituents | Starting Essential oil (%) | Example 2 (%) | Specific Change |
|---|---|---|---|
| Camphor | 24.4 | 1.3 | 24.4 – 1.3 = 23.1 |
| Isoborneol | 7.7 | 13.7 | 13.7 – 7.7 = 6.0 |
| Borneol | 3.5 | 27.1 | 27.1 – 3.5 = 23.6 |
| Curdione | 3.3 | Trace | 3.3 |
| | | | Total = 23.1 + 6.0 + 23.6 + 3.3 = 56 |

TABLE 5

Summary of the specific changes in essential oil constituents in example 3

| Constituents | Starting Essential oil (%) | Example 3 (%) | Specific Change |
|---|---|---|---|
| Camphor | 24.4 | 4.0 | 24.4 – 4 = 20.4 |
| Isoborneol | 7.7 | 12.1 | 12.1 – 7.7 = 4.4 |
| Borneol | 3.5 | 22.4 | 22.4 – 3.5 = 18.9 |
| Curdione | 3.3 | 0.5 | 3.3 – 0.5 = 2.8 |
| | | | Total = 20.4 + 4.4 + 18.9 + 2.8 = 46.5 |

GC-MS Analyses and Identification

The starting material and the value added end products were analyzed with the help of GC/MS analyses. GC/MS analyses were conducted using a Shimadzu QP 2010 using a DB-5 (J&W Scientific, Folsom, USA) capillary column (30 m×0.25 mm i.d.; 0.25 µm thickness). Column temperature, 60° C. (3 minutes) to 240° C. (5 minutes) at 3° C./min. "Injector temperature, 250° C."; "Interface temperature, 250° C."; acquisition mass range, 800-50 amu; Detector Gain, 0.90 KV. Helium was used as carrier gas, 69.3 kPa (39.2 cm/s). Peak identification was accomplished by comparison of their mass spectral fragmentation pattern with those of reported in the literature (Adams, 1995) or by comparing with NIST library search.

GC Analyses (Quantitative Analysis)

The composition of the oil was carried out by GC on Shimadzu GC-17 equipped with a DB-5 (J&W Scientific, Folsom, USA) fused silica capillary column (30 m×0.25 mm i.d.; 0.25 µm film thickness). Column temperature, 90° C. (2 minutes) to 220° C. (5 minutes) with programming at 7° C./min. "Injector temperature, 240° C."; "detector temperature, 260° C."; injection mode, split. Carrier gas was helium at column flow rate of 1.05 ml/min (100 kPa). Retention indices (RI) of the sample components and authentic compounds were determined on the basis of homologous n-alkane hydrocarbons under the same conditions. The quantitative composition was obtained by peak area normalization and the response factor for each component was considered to equal 1.

Advantages of the Invention

1. Fragrance improvement of *Curcuma aromatica* oil.
2. Single step cost effective process for conversion of fragrance of *Curcuma aromatica* oil.
3. The process provides perfumery important borneol enriched product that can also be used in pharmaceutical industries.
4. The process has efficiently removed the camphor fragrance of the *Curcuma aromatica* essential oil, by converting camphor into borneol.
5. Chemical transformation of the camphor into borneol has shifted the fragrance to dry camphoraceous, pine woody, amber and spicy characteristic.
6. The new value added product can be used in decorative cosmetics, fine fragrances, shampoos, toilet soaps and other toiletries etc.
7. The prepared value added product can further undergo for preparation of esters, epoxides, peroxides, acids, amides, halides, ethers and oximes etc. to obtain several other products for perfumery, flavour, pharmaceutical and agrochemical or in some other house hold industries.
8. *Curcuma aromatica*, locally known as *Jungli Haldi*, is found as a wild species through out India and thus the present invention would provide an opportunity for people to cultivate this species as an alternate cash crop.
9. Provides an excellent opportunity to generate employment as rhizome collectors from wild.

The invention claimed is:

1. A process of obtaining a fragrance product of modified essential oils from *Curcuma aromatica*, wherein the said process comprising the steps of:
   (i) providing essential oils from *Curcuma aromatica*;
   (ii) mixing the essential oils in step (i) with an organic solvent in a ratio ranging between 1:5-1:40 to obtain a reaction mixture;
   (iii) cooling the reaction mixture obtained in step (ii) at a temperature range of 10° C. to −20° C.;
   (iv) reducing the cooled reaction mixture obtained in step (iii) by gradually adding a reducing agent to the reaction mixture at a ratio ranging between 1:0.1-1:2, respectively, for a period of 1 hour to 48 hours and at a stirring speed of 100 rpm-1500 rpm, then adding ice water to the reaction mixture to terminate the reaction;
   (v) extracting the reaction mixture obtained in step (iv) three to five times with a solvent at a temperature range of 5° C. to 35° C.;
   (vi) acidifying the solvent extract obtained in step (v) with a dilute acid water to a pH of less than 1 to obtain an acidified extract, then washing the acidified extract with water to obtain a washed product;
   (vii) removing the solvent from the washed product obtained in step (vi) at a temperature range of 40° C. to 50° C. to obtain the fragrance product of modified essential oils from *Curcuma aromatica*.

2. The process as claimed in claim 1, wherein in step (i) the essential oils are obtained from the rhizomes of *Curcuma aromatica* in a whole form or in a crushed form.

3. The process as claimed in claim 1, wherein in step (i) the essential oils from *Curcuma aromatica* are obtained by steam distillation or by hydrodistillation for a period in the range of 5 minutes to 72 hours.

4. The process as claimed in claim 1, wherein in step (iv) the reducing agent is selected from the group consisting of sodium metal, potassium metal, LiAlH4, NaBH4, Aluminum isopropoxide, direct hydrogenation, and combinations thereof.

5. The process as claimed in claim 1, wherein in step (ii) the solvent is selected from the group consisting of methanol, ethanol, propanol, butanol, and combinations thereof.

6. The process as claimed in step (v) of claim 1, wherein the solvent is selected from the group consisting of hexane, petroleum ether, benzene, chloroform, dichloromethane, ethyl acetate, ether, and combinations thereof.

7. The process as claimed in claim 1, wherein the modified essential oils from *Curcuma aromatica* is recovered at a percentage of 70% to 85%.

8. The process as claimed in claim 1, wherein the modified essential oils from *Curcuma aromatica* have a total modification in the range of 37% to 57% with respect to camphor, isoborneol, borneol and cudione.

9. The process as claimed in claim 1, wherein the fragrance product is free from solvent residues.

10. The process as claimed in claim 1, wherein the fragrance product is freely soluble in nonpolar and medium polar solvents.

11. The process of claimed in claim 1, wherein the modified essential oils from *Curcuma aromatica* can be used in a perfumery, a fragrance, a pharmaceutical, a food, an agrochemical; or for preparing esters, epoxides, peroxides, acids, amides, halides, ethers, and/or oximers.

* * * * *